April 4, 1950 J. R. HILDRETH 2,502,844
PHOTOELECTRIC HEAT CONTROL FOR COFFEE BREWERS
Filed Sept. 6, 1947
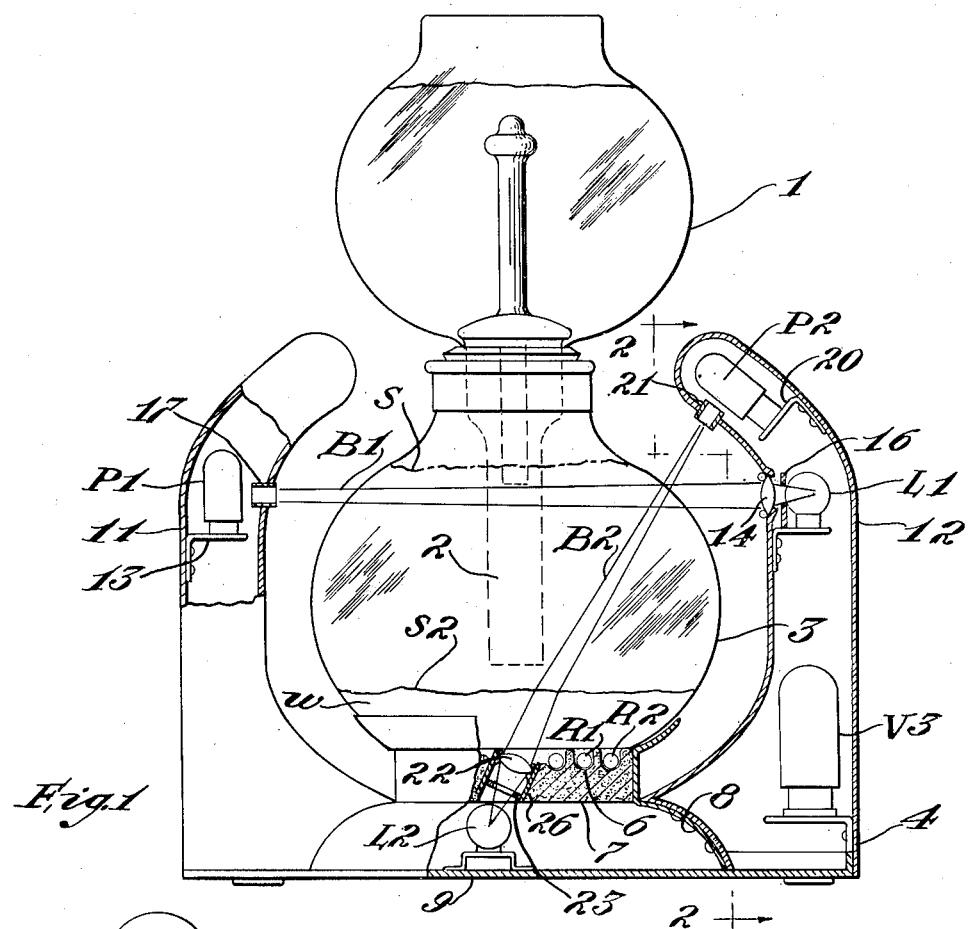
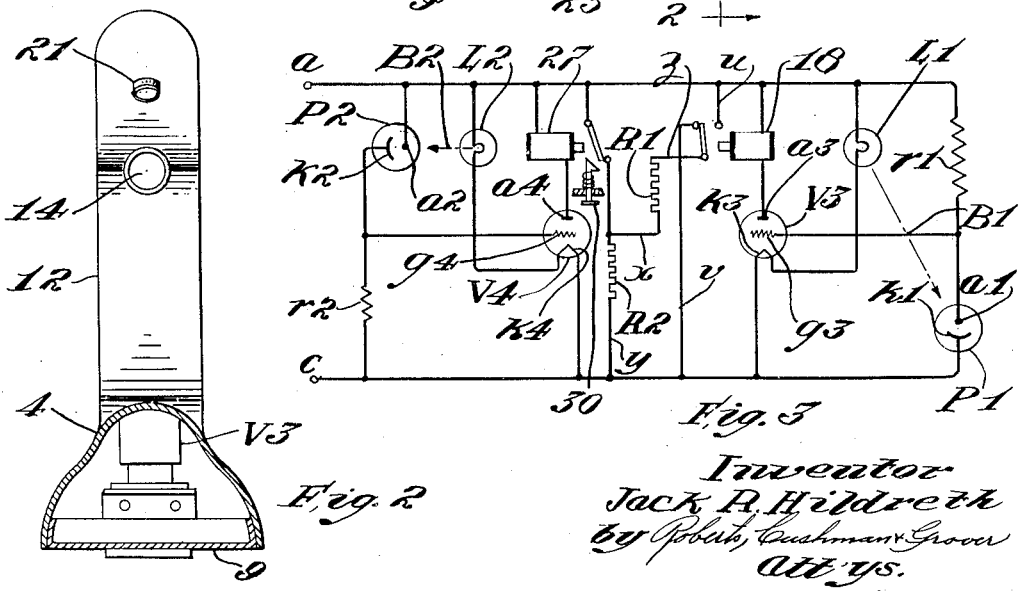
Inventor
Jack R. Hildreth
by Roberts, Cushman & Grover
Att'ys.

Patented Apr. 4, 1950

2,502,844

UNITED STATES PATENT OFFICE 2,502,844

PHOTOELECTRIC HEAT CONTROL FOR COFFEE BREWERS

Jack R. Hildreth, Campton, N. H.

Application September 6, 1947, Serial No. 772,520

4 Claims. (Cl. 219—43)

This invention relates to coffee brewers of the type comprising upper and lower bowls, the upper bowl having an integral tube fitting snugly in the neck of the lower bowl the bottom of which is adapted to set upon a stove, and more particularly to the control of the heat supplied by the stove to the lower bowl during the successive phases of the coffee brewing cycle. Heretofore it has been necessary to control the heat manually, thus requiring close attention by the operator. After water from the lower bowl has remained in the upper bowl long enough to brew the coffee, the heat must be turned off to permit the coffee to descend to the lower bowl. Then it is desirable to turn on a low heat to keep the coffee warm.

To obtain successive bowls of coffee or uniform quality and strength, the aforesaid adjustments must be made at the same times in successive brewing cycles. The constant attention required to adjust the brewer at the proper timing is inconvenient for a busy housewife and, in a restaurant where a continuous supply of coffee is needed, results in additional cost for labor.

The objects of the present invention are to avoid the aforesaid inconvenience, to regulate the heat automatically, to brew each successive bowl of coffee the same length of time at the same temperature, and generally to improve the art of coffee brewing.

In one aspect the present invention contemplates the use with a brewer of the above-mentioned type of a photoelectric element responsive to rays which are refracted when passing obliquely through the air-water surface of the liquid in the lower bowl, and a ray element for energizing the photoelectric element with rays of the aforesaid type. These elements are so positioned relatively to the lower bowl, when it is setting upon the stove, that energy from the ray element is directed obliquely through the surface and, when the liquid in the lower bowl attains a predetermined level, impinges on the photoelectric element. Means are provided for reducing the heat supplied by the stove to the lower bowl responsive to the energization of the photoelectric element when the liquid in the lower bowl attains this predetermined level.

In another aspect the invention contemplates the use with such a brewer of a photoelectric device responsive to rays which are transmitted through water, and a ray device for energizing the photoelectric device with rays of the aforesaid type. These devices are so positioned relatively to the lower bowl, when it is setting upon the stove, that energy from the ray device is directed through the liquid in the lower bowl to impinge upon the photoelectric device. Means are provided for controlling the heat supplied by the stove to the lower bowl responsive to variation of energization of the photoelectric device when the liquid in the lower bowl varies in transmittancy.

In the preferred embodiment the invention contemplates the use of a photoelectric element responsive to rays which are refracted when passing obliquely through the air-water surface. The ray element is so positioned that when the lower bowl rests on the stove the rays pass obliquely through the surface of the water in the lower bowl, and when the surface descends to a predetermined low level, the rays are refracted at this surface to the photoelectric element.

Another photoelectric device responsive to rays which are transmitted through water and another ray device are so positioned relatively to the lower bowl, when it is setting upon the stove, that energy from the ray device is directed through the liquid in the lower bowl to impinge upon the photoelectric device. Relays operated by a control circuit incorporating vacuum tubes are used to connect the resistance elements of the stove in parallel across the power supply circuit in response to the energization of the photoelectric element when the liquid in the lower bowl falls to a predetermined level. These relays reconnect resistances in series in response to a decrease in energization of the photoelectric device when the liquid in the lower bowl decreases in transmittancy.

For purposes of illustration, a typical embodiment of the invention is shown in the accompanying drawing, in which Fig. 1 is an elevation in partial section;

Fig. 2 is a section on line 2—2 of Fig. 1; and

Fig. 3 is a wiring diagram of the control circuit.

In the particular embodiment of the invention chosen for the purpose of illustration, a brewer, consisting of an upper bowl 1 with a dependent tube 2 extending into the transparent lower bowl 3, is shown in position upon an electric stove 4. The lower bowl 3 is adjacent to resistance elements such as heating coils R1 and R2 which are wound in the spiral grooves 6 of the ceramic brick 7. The brick 7 is supported by an arched bracket 8 fastened to the stove base 9 from which also extend the hollow arms 11 and 12.

Housed in arm 12 is a ray device comprising a lamp L1, lens 14 and an aperture plate 16.

An associated photoelectric device, such as a phototube P1 of the type 868, is held by bracket 13 in a corresponding position in arm 11. An aperture tube 17 is mounted in the side wall of arm 11 adjacent to the phototube P1. The lamp L1 and the phototube P1 are relatively so positioned that the light beam B1 from the lamp L1 will pass through the lower bowl 3 and the aperture tube 17 to impinge upon the cathode k1 (Fig. 3) of the phototube P1. The lower end of arm 12 is used to enclose the normally closed relay 18 and the relay control circuit responsive to phototube P1 which comprises a resistor r1 and a vacuum tube V3 of the type 2051.

A lens barrel 26 is inserted in a hole centrally located in the ceramic brick 7. The barrel 26 holds a lens 22 and an aperture plate 23 which comprise the optical system of a ray element. The associated lamp L2 of the ray element is mounted on base 9 adjacent to the lower end of the barrel 26. A photoelectric element such as phototube P2, also of the type 868, is mounted by means of bracket 20 within the top of arm 12. An aperture tube 21 is inserted in the inclined wall of arm 12. The locations of the phototube P2 relatively to the lamp L2 will hereafter be described in connection with the operation of the invention. The lower end of arm 11 houses the double throw relay 27 and the relay control circuit of the phototube P2 comprising the resistor r2 and the vacuum tube V4 of the type 2051.

The wiring diagram of the control circuits is shown in Fig. 3. Line terminals $a$ and $c$ indicate a source of alternating current supplying the phototubes P1, P2, lamps L1, L2 and the vacuum tubes V3, V4. The anode $a2$ is connected to terminal $a$ which is electrically linked to anodes $a1$, $a3$, $a4$ through the resistor r1 and the relays 18, 27 respectively. Resistor r2 completes the circuit from cathode $k2$ to terminal $c$. The cathodes $k1$, $k3$, $k4$ are joined directly to terminal $c$. By joining the other side of cathode $k3$ through lamp L1 to terminal $a$, the cathode heating circuit is established. Lamp L1 serves the dual function of reducing the supply voltage to a value suitable for cathode $k3$ and providing the light source for the beam B1 to operate the phototube P1. Lamp L2 is similarly connected in series with the cathode $k4$ and performs analogous functions with respect to the phototube P2.

The grid $g3$ of vacuum tube V3 is connected between the resistor r1 and the anode $a1$ of phototube P1. The voltage drop through resistor r1 decreases, making grid $g3$ more positive (in the conventional sense), as the impedance of the phototube P1 increases with a diminution of the light falling upon the cathode plate $k1$. Grid $g4$ of the vacuum tube V4 is connected between cathode $k2$ and the resistor r2. This grid $g4$ becomes more positive when the light falling on phototube P2 decreases the impedance of the tube and the voltage drop across the resistor r2 increases.

One end of each of heating coils R1, R2 is joined by wire $x$ which further branches through the contacts of relay 27 to terminal $a$. Wire $y$ directly links the opposite end of heating coil R2 to terminal $c$. The opposite end of heating coil R1 is joined by wire $z$ to the double pole relay 18. In the deenergized position shown, relay 18 connects coil R1 to terminal $c$ through wires $z$ and $v$. When relay 18 is energized the circuit is completed from the heating coil R1 to terminal $a$ by means of wires $z$ and $u$.

To operate the brewer finely ground coffee is measured into the upper bowl 1, the tube 2 of which is tightly inserted into the neck of bowl 3 containing the water $w$. The brewer is placed on the stove 4, the terminals $a$ and $c$ of which are connected to the power supply. When detent 30 is released, relay 27 parallels the heating coils R1 and R2 across the power supply by connecting wire $x$ to terminal $a$. The circuit to terminal $c$ through coil R2 is completed by wire $y$. The relay 18 being deenergized completes the circuit through R1 by means of wires $z$ and $v$ as heretofore described.

The heat radiated from coils R1 and R2 causes the water $w$ in the lower bowl 3 to boil. As the steam pressure increases, the water $w$ is forced through the tube 2 into the upper bowl 1 and the air-water surface descends from the level indicated at $s$ until it reaches the level indicated at $s2$.

Lamp L2 so directs beam B2 through the water $w$ in the lower bowl 3 that the beam is refracted to the right as it emerges from the air-water surface. When the water $w$ is at a level $s$, the distance from the phototube P2 to the surface is short compared to the distance from the surface to the lamp L2. The beam B2 is then refracted to impinge upon the arm 12 well above the aperture tube 21. Although the angle of refraction remains constant, the increase in the distance from the phototube P2 to the surface and the decrease in the distance from the surface to the lamp L2, as the surface descends, shift the beam further towards the right. As the level $s2$ is reached, the beam B2 passes through the aperture tube 21 to impinge on the cathode $k2$. The illumination of the photocell P2 by the beam B2 increases the conductance of the tube. The resulting increase of the voltage drop across resistor r2 makes the grid $g4$ of vacuum tube V4 more positive with respect to the cathode $k4$. As the grid $g4$ becomes positive, the resulting current flow through the vacuum tube V4 energizes relay 27. The contacts of relay 27 are moved to the position to open the circuit of the heating coils R1, R2. The relay 27 is then held in the open position by the detent 30.

After the heat from the stove 4 has been interrupted by the opening of the contacts of relay 27, the liquid which has been steeping in the upper bowl 1 slowly descends and mixes with the remaining water $w$ in the lower bowl 3. As the liquid in the lower bowl 3 rises, its reduced transmittancy, resulting from the mixing with the steeped liquid from the upper bowl 1, decreases the illumination reaching phototube P1 from the beam B1. As the illumination decreases the resistance of the phototube P1 increases. The grid $g3$ becomes more positive with respect to the cathode R3. The resulting current through tube V3 energizes the relay 18 which connects the heating coil elements R1, R2 in series between terminals $a$ and $c$ by means of wires $u$, $x$, $y$. The heat supplied by heating coils R1, R2 in series is one fourth the heat supplied when elements R1, R2 are in parallel across terminals $a$ and $c$. The coffee therefore remains hot, but does not boil and ascend to the upper bowl.

It should be understood that the present disclosure is for the purpose of illustration only and that this invention includes all modifications and equivalents which fall within the scope of the appended claims.

I claim:

1. For use with a brewer of the type comprising an upper bowl having a depending tube extending into a translucent lower bowl, a stove for heating liquid in the lower bowl, a photoelectric element responsive to rays which are refracted when passing obliquely through an air-water surface, a ray element for energizing the photoelectric element with rays of the aforesaid type, said elements being so positioned relatively to the lower bowl when setting upon the stove that energy from the ray element is directed obliquely through the surface of the liquid in said lower bowl to impinge on the photoelectric element when the liquid attains a predetermined level, and means for reducing the heat supplied to the lower bowl by the stove responsive to the energization of said photoelectric element when the liquid in the lower bowl attains a predetermined level.

2. For use with a brewer of the type comprising an upper bowl having a depending tube extending into a translucent lower bowl, a stove for heating liquid in the lower bowl, a photoelectric element responsive to rays which are refracted when passing obliquely through an air-water surface, a ray element for energizing the photoelectric element with rays of the aforesaid type, one of said elements being positioned beneath the lower bowl when setting upon the stove, the other element relatively being so positioned above the surface of the liquid in the lower bowl that energy from the ray element is directed obliquely through the surface of said liquid in the lower bowl to impinge on the photoelectric element when the liquid attains a predetermined level, and means for reducing the heat supplied to the lower bowl by the stove responsive to the energization of said photoelectric element when the liquid in the lower bowl attains a predetermined level.

3. For use with a brewer of the type comprising an upper bowl having a depending tube extending into a translucent lower bowl, a stove for heating liquid in the lower bowl, a photoelectric element responsive to rays which are refracted when passing obliquely through an air-water surface, a ray element for energizing the photoelectric element with rays of the aforesaid type, one of said elements being positioned beneath the lower bowl when setting upon the stove, the other element being so positioned above the surface of the liquid in the lower bowl that energy from the ray element is directed obliquely through the surface of the liquid in said lower bowl to impinge on the photoelectric element when the liquid attains a predetermined level, a photoelectric device responsive to rays which are transmitted through water, a ray device for energizing the photoelectric device with rays of the aforesaid type, said devices being so positioned relatively to the lower bowl when setting upon the stove that energy from the ray device is directed through the liquid in the lower bowl to impinge on the photoelectric device, and means for reducing the heat supplied to the lower bowl by the stove responsive to the energization of said photoelectric element when the liquid in the lower bowl attains a predetermined level and controlling the heat supplied responsive to the variation of energization of said photoelectric device when the liquid in the lower bowl varies in transmittancy.

4. For use with a brewer of the type comprising an upper bowl having a depending tube extending into a translucent lower bowl, an electric stove with resistance elements for heating fluid in the lower bowl, a photoelectric element responsive to rays which are refracted when passing obliquely through an air-water surface, a ray element for energizing the photoelectric element with rays of the aforesaid type, one of said elements being positioned beneath the lower bowl when setting upon the stove, the other element relatively being so positioned above the surface of the liquid in the lower bowl that energy from the ray element is directed obliquely through the surface of the liquid in said lower bowl to impinge on the photoelectric element when the liquid attains a predetermined level, a photoelectric device responsive to rays which are transmitted through water, a ray device for energizing the photoelectric device with rays of the aforesaid type, said devices being so positioned relatively to the lower bowl when setting upon the stove that energy from the ray device is directed through the liquid in the lower bowl to impinge on the photoelectric device, and relays operated by control circuits incorporating vacuum tubes for connecting said resistance elements in parallel responsive to the energization of the photoelectric element when the liquid in the lower bowl attains a predetermined level and reconnecting said resistance elements in series in response to a decrease in energization of the photoelectric device when the liquid in the lower bowl decreases in transmittancy.

JACK R. HILDRETH.

REFERENCES CITED

The following references are of record in the file of this patent:

UNITED STATES PATENTS

| Number | Name | Date |
| --- | --- | --- |
| 1,939,088 | Styer | Dec. 12, 1933 |
| 2,070,617 | Offutt | Feb. 16, 1937 |
| 2,287,583 | Weeks | June 23, 1942 |
| 2,323,128 | Hare | June 29, 1943 |
| 2,436,575 | Johnson | Feb. 24, 1948 |